US007318567B2

(12) United States Patent
Mori et al.

(10) Patent No.: US 7,318,567 B2
(45) Date of Patent: Jan. 15, 2008

(54) CABLE MANAGEMENT DEVICE

(75) Inventors: Kenneth Mori, Los Angeles, CA (US); John Wadsworth, Los Angeles, CA (US)

(73) Assignee: Belkin International, Inc., Compton, CA (US)

( * ) Notice: Subject to any disclaimer, the term of this patent is extended or adjusted under 35 U.S.C. 154(b) by 201 days.

(21) Appl. No.: 11/076,267

(22) Filed: Mar. 7, 2005

(65) Prior Publication Data

US 2006/0196995 A1    Sep. 7, 2006

(51) Int. Cl.
*F16L 3/00* (2006.01)

(52) U.S. Cl. .................. 248/51; 248/51; 248/68.1; 248/74.2; 248/229.16; 248/228.7; 248/230.7; 248/231.81; 24/545; 24/555; 24/556; 24/561; 24/339

(58) Field of Classification Search .......... 248/51, 248/68.1, 74.2, 229.16, 228.7, 230.7, 231.81; 24/545, 555, 556, 561, 339
See application file for complete search history.

(56) References Cited

U.S. PATENT DOCUMENTS

| 1,673,704 | A | * | 6/1928  | Palmer et al. ............... 248/51 |
| 2,413,772 | A | * | 1/1947  | Morehouse ................. 24/457 |
| 2,537,719 | A | * | 1/1951  | Tuepker ................... 174/45 R |
| 2,802,249 | A | * | 8/1957  | Kulp ........................ 24/3.12 |
| 3,032,603 | A | * | 5/1962  | Whitley ................... 174/94 R |
| 3,110,066 | A | * | 11/1963 | Ward et al. ................. 52/469 |
| 3,216,685 | A | * | 11/1965 | Raymond ................. 248/74.2 |
| 3,349,771 | A | * | 10/1967 | Baer ........................ 606/157 |
| 4,362,288 | A | * | 12/1982 | Allen ........................ 248/613 |
| 5,016,336 | A | * | 5/1991  | Barnett et al. ............. 29/281.5 |
| 5,018,260 | A | * | 5/1991  | Ziu ........................... 24/555 |

(Continued)

FOREIGN PATENT DOCUMENTS

DE    299 13 965 U1    11/1999

(Continued)

OTHER PUBLICATIONS

Internet: Cyberguys! Cable Caddy II With Desk, Clamp, Black; Item Number 113 0855 http://www.cyberguys.com/templates/searchdetail.asp?T1=113+0855=; retrieved from the internet on Nov. 23, 2004.

(Continued)

*Primary Examiner*—Carl D. Friedman
*Assistant Examiner*—Nkeisha J. Dumas
(74) *Attorney, Agent, or Firm*—Bryan Cave LLP

(57) ABSTRACT

A cable management device includes a clamping mechanism (110) suitable for attachment to a surface. The clamping mechanism comprises an annular portion (111) having an outside surface (114), an inside surface (115) that forms a perimeter of a cavity (118) interior to the annular portion, a first terminus (116), and a second terminus (117) disposed opposite the first terminus. The first terminus and the second terminus define a gap (151) between them. In one embodiment, the cable management device further comprises a membrane (120, 220) attached to the clamping mechanism at the inside surface, where the membrane contains a first opening (121). In the same or another embodiment, the cable management device further comprises a slot (140) in the annular portion of the clamping mechanism. Both the membrane and the slot enhance the cable management features of the cable management device.

18 Claims, 4 Drawing Sheets

U.S. PATENT DOCUMENTS

| | | | |
|---|---|---|---|
| 5,121,894 A * | 6/1992 | Twork et al. | 248/316.7 |
| 5,257,768 A * | 11/1993 | Juenemann et al. | 248/604 |
| 5,277,387 A * | 1/1994 | Lewis et al. | 248/74.2 |
| 5,377,940 A * | 1/1995 | Cabe et al. | 248/74.3 |
| 6,095,155 A * | 8/2000 | Criscuolo | 132/278 |
| 6,354,543 B1 * | 3/2002 | Paske | 248/68.1 |
| 6,691,381 B2 * | 2/2004 | Scollard et al. | 24/459 |
| 6,969,832 B1 * | 11/2005 | Daughtry, Sr. | 219/531 |
| 7,145,112 B1 * | 12/2006 | Daughtry et al. | 219/521 |
| 2003/0091316 A1 | 5/2003 | Wu et al. | |

FOREIGN PATENT DOCUMENTS

DE    202 17 054 U1    7/2003

OTHER PUBLICATIONS

Desktop Network Connector; produced by Belkin Corporation for Guest-Tek.

* cited by examiner

CABLE MANAGEMENT DEVICE

FIELD OF THE INVENTION

This invention relates generally to cable management and organization, and relates more particularly to a cable management device.

BACKGROUND OF THE INVENTION

The number of cables required by computers and other electronic devices can make cable management a difficult problem. Most electronic devices require at least a power cable, and many also require additional cables to transmit data, receive data, and/or perform other functions. A typical desk or other work area (the terms "work area," "desk," and "desktop" will from this point be used interchangeably herein) has several such cables running between one device and another or between a device and a power outlet. In many cases the power outlet resides in a receptacle located on a wall behind and below the work area, or in a power strip or surge protector on the floor under the work area. The frequent result is an unwieldy tangle of cables that is both unsightly and disorganized.

A further cable management problem arises when the desk is positioned so close to a wall that a person inserting cables cannot get behind the desk. In such a case, the person must usually crouch awkwardly under the desk, or to one side of it, plug the first end of the cable—which often terminates in an adapter that is too large to fit between the desktop and the wall, or through any cable opening in the surface of the desk—into the power outlet, and then place the second end of the cable on the desktop and hope it stays there until it can be grasped from a position above and in front of the desk from which the second cable end can be inserted into the appropriate port or other receptacle. It is not uncommon for the second end of the cable to fall off the desk, requiring the person to return to an uncomfortable position under the desk and to again try to balance the cable end on the desktop. The process is often a frustrating and difficult one.

A third cable management problem is similar to that described in the preceding paragraph. It arises when a free end of a cable is to be permanently left at the surface of the desk so as to be available for insertion into a device when such is desired. As an example, consider a power cord for a cellular telephone (cell phone). According to one typical usage pattern, the cell phone would be placed on the desktop overnight and plugged into the free end of the cell phone's power cord so that the cell phone's battery may be recharged. The end of the power cord opposite the free end would be left permanently in the power outlet. Without some means of holding it in place, the free end of the cable tends to fall off the surface of the desk and onto the floor, from where it must be located and retrieved each time it is to be inserted into the cell phone. Accordingly, there exists a need for a cable management device capable of facilitating both cable organization and cable connection processes.

BRIEF DESCRIPTION OF THE DRAWINGS

The invention will be better understood from a reading of the following detailed description, taken in conjunction with the accompanying figures in the drawings in which.

Figure 1:
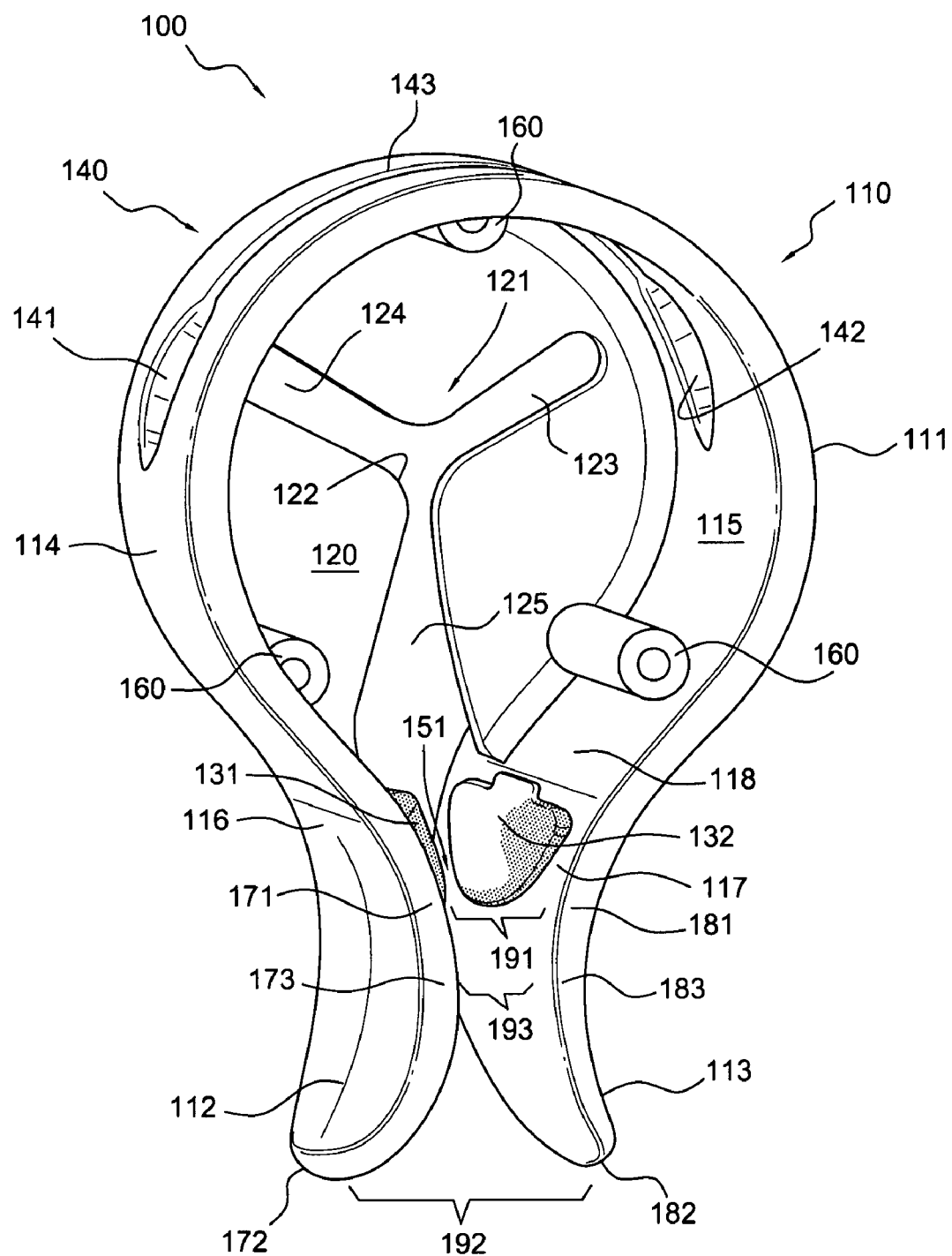
FIG. 1 is a perspective view of a cable management device according to an embodiment of the invention, where a portion of the cable management device is removed so as to show some interior detail of the cable management device.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical, mechanical, or other manner.

DETAILED DESCRIPTION OF THE DRAWINGS

In one embodiment of the invention, a cable management device comprises a clamping mechanism suitable for attachment to a surface and capable of receiving and managing one or more cables. The clamping mechanism comprises an annular portion having an outside surface, an inside surface that forms a perimeter of a cavity interior to the annular portion, a first terminus, and a second terminus disposed opposite the first terminus. The first terminus and the second terminus define a gap between them. The clamping mechanism further comprises a first lip at the first terminus and a second lip at the second terminus, and the first lip and the second lip are biased toward each other.

In one embodiment, the cable management device further comprises a membrane attached to the clamping mechanism at the inside surface, where the membrane contains a first opening. In the same or another embodiment, the cable management device further comprises a slot in the annular portion of the clamping mechanism. Both the membrane and the slot enhance the cable management features of the cable management device.

One such cable management feature is the ability to maintain a plurality of cables in an orderly bundle, and to guide the bundle of cables neatly along an orderly path. As an example, one or more cables may be inserted through the opening in the membrane, and the cable management device may either be clamped to a desk or other object or may be left to slide freely along the length of the cables it encloses. If desired, the cable management device may be used with one or more similar or identical cable management devices, all of which may be clamped to the desk or other object in spaced apart fashion, thus constraining the cables to travel neatly between them. For example, if the cable management devices are clamped to the back of a desk, at least a portion of the cables inserted through their openings will be hidden from view behind the desk.

Another cable management feature made possible by the cable management device is the ability to hold a cable end in a position from which it can be easily reached. Such an ability may be useful whenever the cable end would fall to the ground or move to a less accessible location in the absence of the cable management device. A recharging cable tip for a cell phone is one example of a cable end to which access is frequently needed at the desktop but which would often fall to the ground when removed from the cell phone unless kept in place by a retaining force of some kind. The cable management device is capable of holding the cable tip in an easily accessible position in an aesthetically pleasing manner.

Referring now to the figures, FIG. 1 is a perspective view of a cable management device 100 according to an embodiment of the invention. In the figure, a portion of cable management device 100 is removed so as to show some interior detail of cable management device 100. As illustrated in FIG. 1, cable management device 100 comprises a clamping mechanism 110 comprising an annular portion 111, a lip 112, and a lip 113. Lips 112 and 113 are biased toward each other as a result of the material or materials that make up clamping mechanism 110. A material that is substantially unbreakable, has a low coefficient of friction, and is flexible without having a memory would allow cable management device 100 to perform as intended. One such material is polypropylene. A polypropylene blend also exhibits the desired characteristics, as does an appropriately-shaped piece of spring steel. Any of the foregoing materials, or a similar material, may be used to form clamping mechanism 110, including lips 112 and 113. In one embodiment, the polypropylene or other material can be coated with a plastic or rubber coating or the like. Such coating can be methane-based, vinyl-based, or the like, and can coat all of or just a portion of clamping mechanism 110. As an example, the coating could be located where clamping mechanism 110 grips a surface and/or around the slot in the annular portion.

In use, clamping mechanism 110 can be flexed such that lips 112 and 113 open, or move apart, but the fact that lips 112 and 113 are biased toward each other, as well as the material's lack of memory, ensure that lips 112 and 113 move toward each other again once the flexing force is removed. In at least one embodiment, the bias is not of sufficient strength to cause lips 112 and 113 to touch each other, but rather is sufficient only to bring them into a resting position in which they are separated by a distance such as is illustrated in FIG. 1. The actual separation distance is not specified because its exact size is unimportant. In one preferred embodiment the separation distance is sufficient to allow the passage of a cable having a diameter as large or larger than any of the cables that will likely be used with cable management device 100.

In the illustrated embodiment, lip 112 forms a first curve and the second lip forms a second curve. Lip 112 comprises a proximal end 171, a distal end 172, and a midsection 173 between proximal end 171 and distal end 172. Proximal end 171, distal end 172, and midsection 173 are portions of the first curve. Similarly, lip 113 comprises a proximal end 181, a distal end 182, and a midsection 183 between proximal end 181 and distal end 182, with proximal end 181, distal end 182, and midsection 183 being portions of the second curve. Proximal ends 171 and 181 are separated by a distance 191, distal ends 172 and 182 are separated by a distance 192, and midsections 173 and 183 are separated by a distance 193, where distance 193 is smaller than distance 191 and distance 192. In one embodiment, distance 192 is larger than distance 191. In one embodiment, when clamping mechanism 110 is at rest, distance 193 is between approximately half a centimeter and one centimeter.

The described geometry allows clamping mechanism 110 to be pushed with one hand onto a desk or other surface (not shown) and clamped thereto. The sloping surfaces of the first and second curves act as ramps along which lips 112 and 113 smoothly travel during the clamping process. There is no need to manually pry lips 112 and 113 apart; such parting occurs naturally due to the described geometry of clamping mechanism 110.

Clamping mechanism 110 further comprises a tongue 131 and a tongue 132, both located at inside surface 115. Tongues 131 and 132 are included in cable management device 100 in order to protect the desk or other surface to which clamping mechanism 110 is attached, as well as to help clamping mechanism 110 retain its grip on the desk or other surface. Accordingly, tongues 131 and 132 are constructed of a material that is relatively soft and springy, flexible, and has a high coefficient of friction. A thermoplastic elastomer or other elastomer has the described properties, and is suitable as the material for tongues 131 and 132. The tongues can have any shape, and are not limited to the shape shown in the drawings.

Annular portion 111 has an outside surface 114, an inside surface 115, a terminus 116, and a terminus 117. Terminus 116 is adjacent to, and flows smoothly into, lip 112. Similarly, terminus 117 is adjacent to, and flows smoothly into, lip 113. The exact location of any boundary between terminus 116 and lip 112, or between terminus 117 and lip 113, is of little importance. Indeed, in certain embodiments, any such boundary is imaginary, and is referred to only as a mechanism to aid in the description of cable management device 100.

Inside surface 115 forms a perimeter of a cavity 118 interior to annular portion 111. Terminus 117 is disposed opposite, in facing relationship to, terminus 116 such that terminus 116 and terminus 117 define therebetween a gap 151 which is part of cavity 118.

Cable management device 100 further comprises a membrane 120 attached to clamping mechanism 110 at inside surface 115. Membrane 120 contains an opening 121 capable of receiving one or more cables, as will be further discussed below. Membrane 120 may be constructed of the same elastomer or similar material used for tongues 131 and 132, which material allows membrane 120 to flex in response to the number of cables that are inserted therethrough. In one embodiment, membrane 120, or another feature of cable management device 100, may be provided with a visual indication of, for example, a type of cable carried by cable management device 100. As an example, membrane 120 or the other feature may be color coded.

In at least one embodiment, membrane 120 is a first one of at least two membranes attached to clamping mechanism 110, and cable management device 100 further comprises a second membrane attached to clamping mechanism 110 at inside surface 115 and opposite membrane 120. For purposes of clarity, the second membrane is not shown in FIG. 1; however, the second membrane, in one embodiment, contains a second opening that is aligned with opening 121, such that a cable placed within cavity 118 may smoothly pass through both opening 121 and the second opening.

Referring still to FIG. 1, cable management device 100 still further comprises one or more bosses 160 at inside surface 115. Bosses 160, which can be formed integrally with clamping mechanism 110 in an injection molding or similar process, facilitate the attachment of membranes 120 and 220 to clamping mechanism 110, as will be further discussed below.

Figure 2:
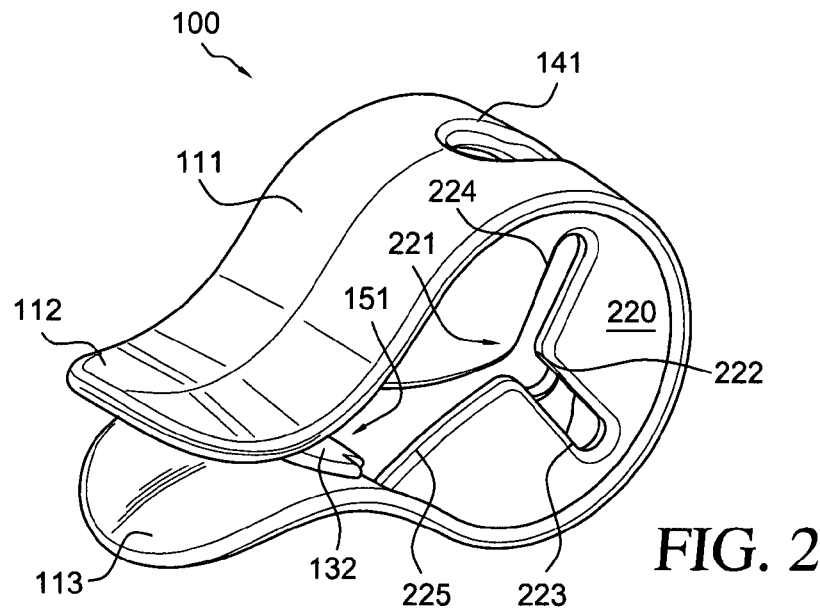
FIG. 2 is a different perspective view of the cable management device of FIG. 1 according to an embodiment of the invention.
Figure 3:
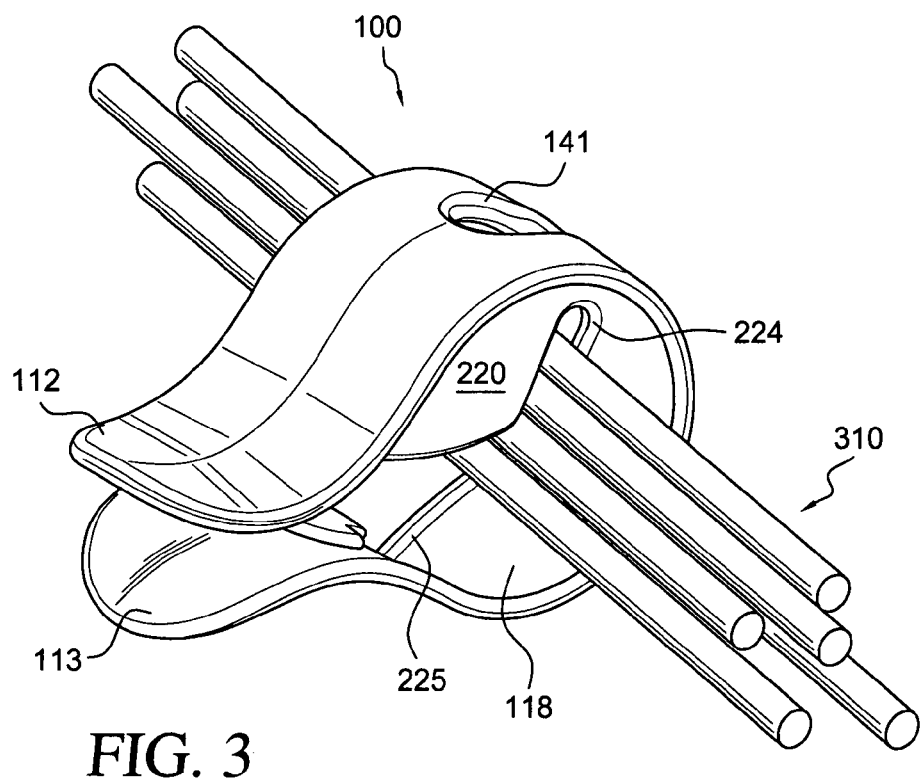
FIG. 3 is a perspective view of the cable management device holding a plurality of cables according to an embodiment of the invention.

FIG. 2 is a different perspective view of cable management device 100 according to an embodiment of the invention. The second membrane and the second opening, referred to hereinafter as membrane 220 and opening 221, respectively, are shown in FIG. 2. Membrane 220 may be constructed of the same elastomer or similar material used for tongues 131 and 132 and for membrane 120. FIG. 3 is a perspective view of cable management device 100 holding a plurality of cables.

Referring to FIGS. 1, 2, and 3, opening 121 comprises a central portion 122, a branch 123 communicating with central portion 122, a branch 124 communicating with central portion 122, and a branch 125 communicating with central portion 122 and with gap 151. Similarly, opening 221 comprises a central portion 222, a branch 223 communicating with central portion 222, a branch 224 communicating with central portion 222, and a branch 225 communicating with central portion 222 and with gap 151. In one embodiment, central portions 122 and 222 are aligned with each other. In the same or another embodiment, branches 123 and 223 are aligned with each other, branches 124 and 224 are aligned with each other, and branches 125 and 225 are aligned with each other. Such an arrangement allows a plurality of cables 310 to pass through cavity 118 and be maintained in an orderly fashion. It will be understood that only a portion of cables 310 is shown in FIG. 3, and that cables 310, if seen along their entire length, would not necessarily be straight and stiff as they are depicted in FIG. 3.

As illustrated in FIG. 3, cables 310 fit within one or more of central portion 222 and branches 223, 224, and 225. Branches 223, 224, and 225 divide membrane 220 into three flaps that are each capable of flexing and deforming either independently of each other or in coordination with either or both of the other flaps. Thus, membrane 220 is capable of flexing and deforming so as to accommodate a greater or lesser number of cables. The temporary deformation of membrane 220 temporarily alters the size of central portion 222 and branches 223, 224, and 225. It will be understood that membrane 120, central portion 122, and branches 123, 124, and 125 function and respond in similar fashion.

Referring still to FIGS. 1, 2, and 3, annular portion 111 of clamping mechanism 110 comprises a slot 140 extending through outside surface 114 and inside surface 115. Slot 140 comprises an enlarged portion 141, an enlarged portion 142, and a main portion 143 between enlarged portion 141 and enlarged portion 142. As illustrated, enlarged portions 141 and 142 are wider than main portion 143. As an example, slot 140 can be formed during the formation of clamping mechanism 110 as part of an injection molding or similar process, or can be cut into clamping mechanism 110 after the formation of clamping mechanism 110.

Figure 4:
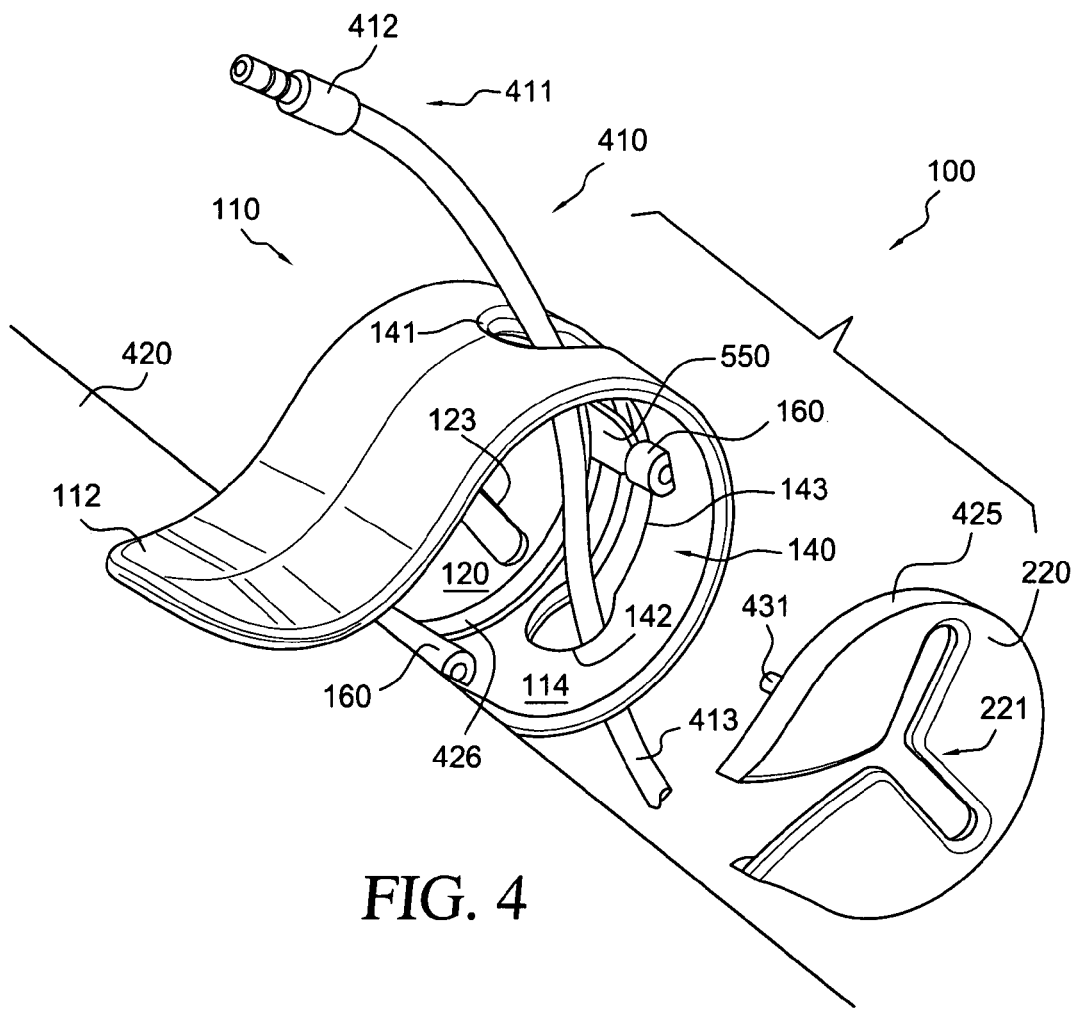
FIG. 4 is an exploded view of the cable management device according to an embodiment of the invention.

The foregoing geometry allows cable management device 100 to be operated as described in connection with the following embodiment, where particular cables and functions are illustrative of a much broader range of possibilities. The illustrative embodiment is depicted in FIG. 4, which is an exploded view of cable management device 100 according to an embodiment of the invention. The illustrative embodiment is that of a cable 410 used for powering and recharging a cell phone battery. One end of cable 410 is plugged into a power outlet behind and below the surface of a desk 420. The other end, a free end 411, of cable 410 is attached to a cable tip 412 that is to be inserted into a port on the cell phone itself. When cable tip 412 is plugged into the cell phone, the weight of the phone is sufficient to keep cable tip 412 from falling off desk 420. When cable tip 412 is removed from the cell phone, however, its weight is often so slight that it tends to fall off desk 420 and onto the floor in the vicinity of the power outlet, requiring the user of cable 410 to crouch down and hunt for cable tip 412 on the floor, where it may get lost among other cables.

To avoid that outcome, with cable management device 100 clamped to desk 420, cable 410 may be inserted in slot 140 by pressing cable 410 lengthwise into main portion 143 such that cable tip 412 protrudes from enlarged portion 141, which in FIG. 4 is depicted as being the uppermost one of the enlarged portions of slot 140. Cable 410 extends downward and exits cable management device 100 through enlarged portion 142. Slot 140 is constructed such that enlarged portions 141 and 142 are smaller than cable tip 412, but larger than a main body 413 of cable 410 that extends away from cable tip 412. The result is that cable 410 can move freely within enlarged portions 141 and 142, but does not fall out of slot 140 because cable tip 412 cannot freely pass through enlarged portion 141. Cable tip 412 is thus held in place at or near the surface of desk 420, ready to be grasped and placed into the cell phone when such action is desired.

Referring still to FIG. 4, membrane 220 comprises a pin 431 that, together with additional, similar pins that are also attached to membrane 220 but that are not visible in FIG. 4, cooperates with bosses 160 to attach membranes 120 and 220 to clamping mechanism 110. Membrane 120 can have similar pins, not shown, that function in a similar manner. In one embodiment, pins 431 are inserted into bosses 160, and bosses 160 are then crushed around pins 431 in order to hold membranes 120 and 220 permanently in place. In another embodiment, an adhesive, such as a drop of glue, is placed on pins 431 and/or in bosses 160, and the adhesive serves to hold membranes 120 and 220 in place. Other attachment methods are also possible, as known in the art.

In the illustrated embodiment, membrane 220 comprises a rigid frame 425, and membrane 120 comprises a rigid frame 426, that give strength to cable management device 100. Rigid frames 425 and 426 have similar features, and can be constructed of the same polypropylene or other material used for the construction of clamping mechanism 110. Using the same material or similar materials for both rigid frames 425 and 426 and clamping mechanism 110, including bosses 160, allows for an easier and more secure attachment between membranes 120 and 220 and clamping mechanism 110 than would be possible in the absence of the rigid frames. Without the rigid frames, the softer material of membranes 120 and 220 would have to be attached to the harder material of clamping mechanism 110, and such attachment of hard and soft materials is more difficult and less secure than an attachment between more closely matched materials.

Figure 5:
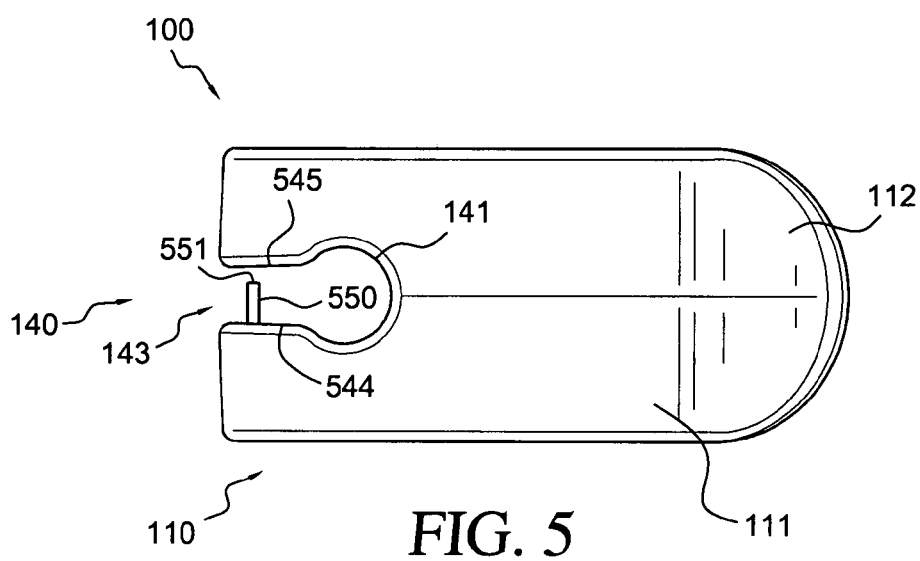
FIG. 5 is a top view of the cable management device according to an embodiment of the invention.

FIG. 5 is a top view of cable management device 100 according to an embodiment of the invention. As illustrated in FIG. 5, main portion 143 of slot 140 comprises a sidewall 544 and a sidewall 545 opposite sidewall 544. Slot 140 further comprises a tab 550 attached to and extending away from sidewall 544 and toward sidewall 545. In another embodiment, tab 550 could be attached to sidewall 545 and extend toward sidewall 544. Although tab 550 is first described in this discussion of FIG. 5, it was first shown, without comment in the accompanying text, in FIG. 4.

Tab 550 is flexible, and in at least one embodiment is constructed of the same elastomer or similar material used for tongues 131 and 132 and for membranes 120 and 220. Tab 550 enables slot 140 to accept and hold cables of various gauges. Larger cables will cause tab 550 to flex out of the way while the cable is being pushed through slot 140. Smaller cables will be held in place between tab 550 and sidewall 545 by the pressure exerted by tab and sidewall against the sides of the cable. In a particular embodiment, a width of main portion 143, measured from sidewall 544 to sidewall 545, is approximately six millimeters, and a distance between sidewall 545 and an end 551 of tab 550 is approximately 1.5 millimeters. The described dimensions are designed to work well with a wide range of currently-available cables gauges. Many other dimensions outside the described range are, of course, also possible and would also work well for particular applications and cables.

Although slot 140 can be oriented in any fashion and at any angle with respect to annular portion 111, the illustrated embodiment depicts enlarged portion 141 as being adjacent to terminus 116 and enlarged portion 142 as being adjacent to terminus 117. The illustrated embodiment further depicts main portion 143 forming a substantially straight line between enlarged portion 141 and enlarged portion 142. The result is that slot 140 runs substantially lengthwise along annular portion 111. The illustrated geometry leads to a situation in which cable tip 412 is presented at the surface of desk 420 in an attitude conducive to ease of use. In other words, with cable management device 100 clamped to desk 420 as shown, the described geometry means cable tip 412 will be presented in an upright posture ready to be pulled vertically up and perpendicularly away from the floor and, after removal from the cell phone or other device, ready to be returned to its waiting position with cable tip 412 resting on or near enlarged portion 141.

Figure 6:
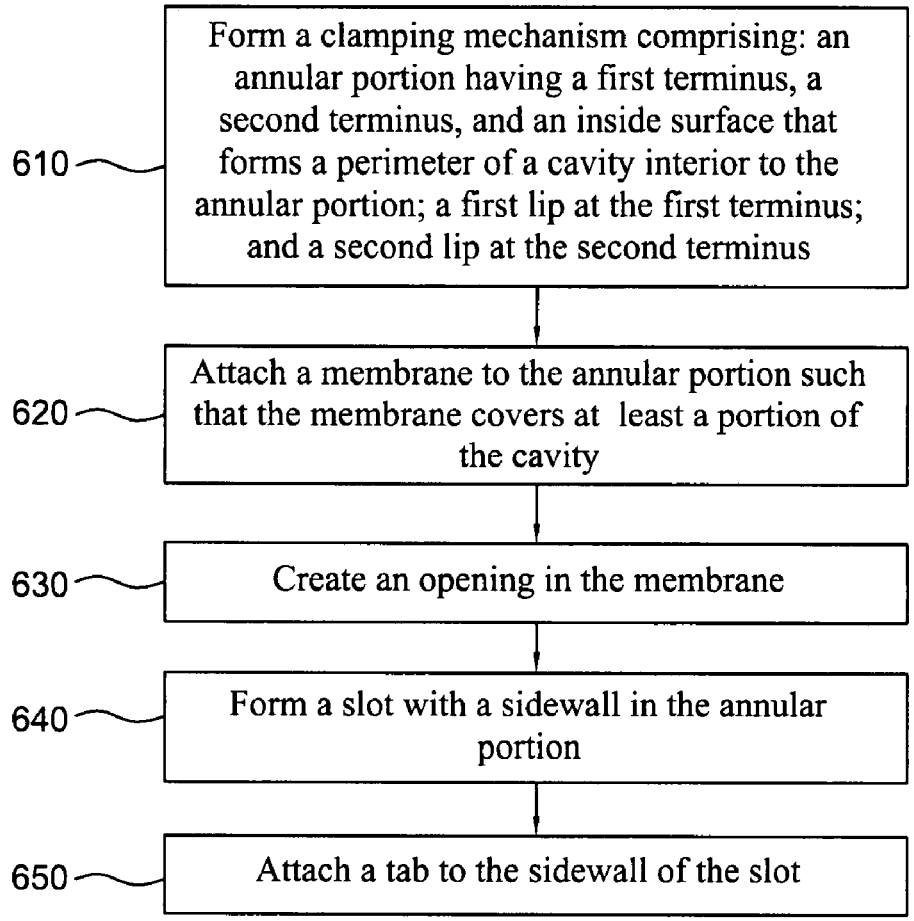
FIG. 6 is a flowchart illustrating a method of manufacturing a cable management device according to an embodiment of the invention.

FIG. 6 is a flowchart illustrating a method 600 of manufacturing a cable management device according to an embodiment of the invention. A step 610 of method 600 is to form a clamping mechanism comprising: an annular portion having a first terminus, a second terminus, and an inside surface that forms a perimeter of a cavity interior to the annular portion; a first lip at the first terminus; and a second lip at the second terminus. As an example, the clamping mechanism, with all of its components and features can be similar to clamping mechanism 110, with all of its corresponding components and features, at least some of which were first shown in FIG. 1.

A step 620 of method 600 is to attach a membrane to the annular portion such that the membrane covers at least a portion of the cavity. As an example, the membrane can be similar to membrane 120, first shown in FIG. 1, and/or to membrane 220, first shown in FIG. 2. In one embodiment, steps 610 and 620 are performed in a single process, such as an injection molding or other molding process.

A step 630 of method 600 is to create an opening in the membrane. As an example, the opening can be similar to opening 121, first shown in FIG. 1, and/or opening 221, first shown in FIG. 2.

A step 640 of method 600 is to form a slot with a sidewall in the annular portion. As an example, the slot and the sidewall can be similar to, respectively, slot 140, first shown in FIG. 1, and sidewall 544 and/or sidewall 545, both of which were first shown in FIG. 5.

A step 650 of method 600 is to attach a tab to the sidewall of the slot. As an example, the tab can be similar to tab 550, first described in the discussion of FIG. 5. In one embodiment, step 650 may be omitted, leaving the cable management device without a tab. The cable management device would still function well in that embodiment, but would not be as well-equipped to handle cables of varying gauges as would a cable management device having a tab in the slot.

Although the invention has been described with reference to specific embodiments, it will be understood by those skilled in the art that various changes may be made without departing from the spirit or scope of the invention. Various examples of such changes have been given in the foregoing description. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that the cable management device discussed herein may be implemented in a variety of embodiments, and that the foregoing discussion of certain of these embodiments does not necessarily represent a complete description of all possible embodiments. Rather, the detailed description of the drawings, and the drawings themselves, disclose at least one preferred embodiment of the invention, and may disclose alternative embodiments of the invention.

All elements claimed in any particular claim are essential to the invention claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A cable management device comprising:
a clamping mechanism comprising:
an annular portion having:
an outside surface;
an inside surface that forms a perimeter of a cavity interior to the annular portion;
a first terminus; and
a second terminus disposed opposite the first terminus such that the first terminus and the second terminus define a gap therebetween;
a first lip at the first terminus; and
a second lip at the second terminus; and
a membrane attached to the clamping mechanism at the inside surface,
wherein:
the membrane contains a first opening and does not contact the outer surface; and
the first lip and the second lip are biased toward each other.

2. A cable management device comprising:
a clamping mechanism comprising:
an annular portion having:
an outside surface;
an inside surface that forms a perimeter of a cavity interior to the annular portion;
a first terminus; and
a second terminus disposed opposite the first terminus such that the first terminus and the second terminus define a gap therebetween;
a first lip at the first terminus; and
a second lip at the second terminus; and
a membrane attached to the clamping mechanism at the inside surface,
wherein:
the membrane contains a first opening;
the first lip and the second lip are biased toward each other; and
the annular portion of the clamping mechanism comprises a slot extending through the outside surface and the inside surface.

3. The cable management device of claim 2 wherein:
the slot comprises:
a first enlarged portion;
a second enlarged portion; and
a main portion between the first enlarged portion and the second enlarged portion;
the first enlarged portion has a first width;
the main portion has a second width; and
the first width is greater than the second width.

4. The cable management device of claim 3 wherein:
the main portion of the slot comprises a first sidewall and a second sidewall;
the slot further comprises a tab attached to the first sidewall; and
the tab extends away from the first sidewall and toward the second sidewall.

5. The cable management device of claim 3 wherein:
the first enlarged portion is adjacent to the first terminus;
the second enlarged portion is adjacent to the second terminus; and
the main portion forms a substantially straight line between the first enlarged portion and the second enlarged portion.

6. A cable management device comprising:
a clamping mechanism comprising:
an annular portion having:
an outside surface;
an inside surface that forms a perimeter of a cavity interior to the annular portion;
a first terminus; and
a second terminus disposed opposite the first terminus such that the first terminus and the second terminus define a gap therebetween;
a first lip at the first terminus; and
a second lip at the second terminus; and
a membrane attached to the clamping mechanism at the inside surface,
wherein:
the membrane contains a first opening;
the first lip and the second lip are biased toward each other;
the first lip forms a first curve and the second lip forms a second curve;
the first lip comprises a first proximal end, a first distal end, and a first midsection between the first proximal end and the first distal end;
the second lip comprises a second proximal end, a second distal end, and a second midsection between the second proximal end and the second distal end;
the first proximal end, the first distal end, and the first midsection are portions of the first curve;
the second proximal end, the second distal end, and the second midsection are portions of the second curve;
the first proximal end and the second proximal end are separated by a first distance;
the first midsection and the second midsection are separated by a second distance;
the first distal end and the second distal end are separated by a third distance; and
the second distance is smaller than the first distance and the third distance.

7. The cable management device of claim 6 wherein:
the third distance is larger than the first distance.

8. The cable management device of claim 6 wherein:
the first lip and the second lip are formed from a first material;
the clamping mechanism further comprises a first tongue and a second tongue at the inside surface; and
the first tongue and the second tongue are formed from a second material.

9. A cable management device comprising:
a clamping mechanism comprising:
an annular portion having:
an outside surface;
an inside surface that forms a perimeter of a cavity interior to the annular portion;
a first terminus; and
a second terminus disposed opposite the first terminus such that the first terminus and the second terminus define a gap therebetween;
a first lip at the first terminus; and
a second lip at the second terminus; and
a membrane attached to the clamping mechanism at the inside surface,
wherein:
the membrane contains a first opening;
the first lip and the second lip are biased toward each other;
the membrane is a first one of at least two membranes attached to the clamping mechanism;

the cable management device further comprises a second
   membrane attached to the clamping mechanism at the
   inside surface;
the second membrane contains a second opening; and
the second opening is aligned with the first opening.

10. The cable management device of claim 9 wherein:
at least one of the membrane and the second membrane
   has a rigid frame.

11. The cable management device of claim 9 wherein:
the first opening comprises:
   a first central portion;
   a first branch communicating with the first central
      portion;
   a second branch communicating with the first central
      portion; and
   a third branch communicating with the first central
      portion and with the gap;
the second opening comprises:
   a second central portion;
   a fourth branch communicating with the second central
      portion;
   a fifth branch communicating with the second central
      portion; and
   a sixth branch communicating with the second central
      portion and with the gap;
the first central portion and the second central portion are
   aligned with each other;
the first branch and the fourth branch are aligned with
   each other;
the second branch and the fifth branch are aligned with
   each other; and
the third branch and the sixth branch are aligned with each
   other.

12. A cable management device comprising:
a clamping mechanism comprising:
   an annular portion having:
      an outside surface;
      an inside surface that forms a perimeter of a cavity
         interior to the annular portion;
      a first terminus; and
      a second terminus disposed opposite the first terminus such that the first terminus and the second
         terminus define a gap therebetween;
      a first lip at the first terminus; and
      a second lip at the second terminus,
   wherein:
      the first lip and the second lip are biased toward each
         other;
      the annular portion of the clamping mechanism comprises a slot extending through the outside surface
         and the inside surface;
   the slot comprises:
      a first enlarged portion;
      a second enlarged portion; and
      a main portion between the first enlarged portion and
         the second enlarged portion;
   the first enlarged portion has a first width;
   the main portion has a second width;
   the first width is greater than the second width;
   the main portion of the slot comprises a first sidewall and
      a second sidewall;
   the slot further comprises a tab attached to the first
      sidewall; and
   the tab extends away from the first sidewall and toward
      the second sidewall.

13. A cable management device comprising:
a clamping mechanism comprising:
   an annular portion having:
      an outside surface;
      an inside surface that forms a perimeter of a cavity
         interior to the annular portion;
      a first terminus; and
      a second terminus disposed opposite the first terminus such that the first terminus and the second
         terminus define a gap therebetween;
      a first lip at the first terminus; and
      a second lip at the second terminus,
   wherein:
      the first lip and the second lip are biased toward each
         other;
      the annular portion of the clamping mechanism comprises a slot extending through the outside surface
         and the inside surface;
   the slot comprises:
      a first enlarged portion;
      a second enlarged portion; and
      a main portion between the first enlarged portion and
         the second enlarged portion;
   the first enlarged portion has a first width;
   the main portion has a second width; and
      the first width is greater than the second width;
   the first lip forms a first curve and the second lip forms a
      second curve;
   the first lip comprises a first proximal end, a first distal
      end, and a first midsection between the first proximal
      end and the first distal end;
   the second lip comprises a second proximal end, a second
      distal end, and a second midsection between the second
      proximal end and the second distal end;
   the first proximal end, the first distal end, and the first
      midsection are portions of the first curve;
   the second proximal end, the second distal end, and the
      second midsection are portions of the second curve;
   the first proximal end and the second proximal end are
      separated by a first distance;
   the first midsection and the second midsection are separated by a second distance;
   the first distal end and the second distal end are separated
      by a third distance;
   the second distance is smaller than the first distance and
      the third distance; and
   the third distance is larger than the first distance.

14. The cable management device of claim 13 wherein:
the first lip and the second lip are formed from a first
   material;
the clamping mechanism further comprises a first tongue
   and a second tongue at the inside surface; and
the first tongue and the second tongue are formed from a
   second material.

15. The cable management device of claim 1 wherein:
the membrane is only coupled to a portion of the inside
   surface.

16. The cable management device of claim 1 wherein:
the clamping mechanism further comprises at least one
   tongue at the inside surface.

17. The cable management device of claim 1 wherein:
the first opening comprises:
- a first central portion; and
- one or more branches in communicating with the first central portion.

18. The cable management device of claim 2 wherein:
the clamping mechanism further comprises at least one tongue at the inside surface.

* * * * *